United States Patent [19]

Koide

[11] Patent Number: 4,724,494

[45] Date of Patent: Feb. 9, 1988

[54] TRACKING APPARATUS RESPONSIVE TO MULTIPLE FREQUENCY-MODULATED CARRIERS ON DIFFERENT TRACKS

[75] Inventor: Hajime Koide, Ichikawa, Japan

[73] Assignee: Victor Company of Japan, Limited, Japan

[21] Appl. No.: 599,670

[22] Filed: Apr. 12, 1984

[30] Foreign Application Priority Data

Apr. 12, 1983 [JP] Japan .................................. 58-64140
Apr. 12, 1983 [JP] Japan .................................. 58-64141

[51] Int. Cl.$^4$ ...................... G11B 21/10; G11B 5/592; H04N 5/782
[52] U.S. Cl. .................................... 360/19.1; 360/30; 360/77; 360/20
[58] Field of Search .................... 300/19.1, 27, 30, 77, 300/20, 28

[56] References Cited

U.S. PATENT DOCUMENTS

| | | | |
|---|---|---|---|
| 3,491,347 | 1/1970 | Farrand | 360/77 |
| 3,846,819 | 11/1974 | Warren | |
| 4,056,832 | 11/1977 | de Boer et al. | 360/77 |
| 4,303,950 | 12/1981 | Taniguchi et al. | 360/8 |
| 4,306,261 | 12/1981 | Bergmans et al. | 360/77 |
| 4,486,793 | 12/1984 | Todd | 360/30 |
| 4,490,751 | 12/1984 | Kono et al. | 360/19.1 |
| 4,492,986 | 1/1985 | Kono et al. | 360/19.1 |

FOREIGN PATENT DOCUMENTS

| | | |
|---|---|---|
| 3,139,810 | 5/1982 | Fed. Rep. of Germany . |
| 3,334,452 | 3/1984 | Fed. Rep. of Germany . |
| 2518346 | 6/1983 | France . |
| 2095436 | 9/1982 | United Kingdom . |

OTHER PUBLICATIONS

IBM Technical Disclosure Bulletin, vol. 11, No. 7, Dec. 1968, p. 793.
Patents Abstracts of Japan, vol. 8, No. 23 (P-251) (1460), Jan. 31, 1984; & JP-A-58 179933 (Sony Co.) 21-10-1983.
Patents Abstracts of Japan, vol. 7, No. 32 (P-174) (1177), Feb. 8, 1983; & JP-A-57 186228 (Hitachi Seisakusho K.K.) 16-11-1982.

Primary Examiner—Raymond F. Cardillo
Assistant Examiner—Hoa T. Nguyen
Attorney, Agent, or Firm—Lowe, Price, LeBlanc, Becker & Shur

[57] ABSTRACT

In a recording apparatus frequency modulators (25-28) are provided for carriers having different frequencies with an information signal. The different frequency carriers are sequentially combined by a switch (12) and applied to a recording head in response to the head being shifted from one track to the next to record each of the carriers on a different track, so that there is a difference in frequency between carriers recorded on adjacent tracks. During playback, the frequency-modulated carriers are sequentially reproduced and separated by band-pass filters (25-24) into individual carriers, frequency-demodulated respectively by demodulators (29-32) and sequentially combined by a switch (33) to form the original information signal. Tracking control circuit (100) is provided to control the lateral position of the transducer head in response to the carriers which are derived from tracks on opposite sides of the track being scanned.

15 Claims, 16 Drawing Figures

TRACKING APPARATUS RESPONSIVE TO MULTIPLE FREQUENCY-MODULATED CARRIERS ON DIFFERENT TRACKS

BACKGROUND OF THE INVENTION

The present invention relates generally to recording and/or reproducing apparatus, and more particularly to apparatus in which audio signal is modulated upon a carrier whose frequency is switched from one frequency to another in response to a transducer head being switched from one track to the next and recorded on a common track with a video signal and upon playback a tracking control signal is derived from frequency-modulated crosstalk components detected from side tracks.

In helical scan type magnetic tape recording and reproducing apparatus, a pair of transducer heads are mounted at equal angular positions on the circumference of a rotary drum and a magnetic tape is looped around the drum over an arc of 180-degree and transported at a speed much lower than the circumferential speed of the rotary drum, and audio signal is recorded through stationary heads along one edge of the tape.

In video tape recording, the recent effort is toward recording as much video information as possible in as small a tape length as possible and lowering the tape transport speed. One disadvantage of the stationary head recording is that reduction in tape transport speed tends to degrade sound quality much more than it adversely affects on picture quality.

To overcome this problem, shared use of common tracks by video and sound signals has been developed. According to this method, baseband audio signal is modulated on a single carrier having a frequency differing from the frequency ranges of modulated video components. Because of the high rotational speed of the rotary drum, high quality sound recording is made possible even when the tape transport speed is lowered.

On the other hand, recent advances in tape recording material and in transducer heads have made possible high density video recording, which has enabled reduction of tape speed to such an extent that a single cassette tape for home video tape recorders can hold six-hour recordings. In such high density recording, signals are recorded on narrow, closely spaced apart tracks with no guard bands therebetween. A high degree of precision is thus required for controlling the transducer head to keep it in registry with desired track. This is particularly important for home video tape recorders where the tape drive mechanism is required to be as simple as possible to meet the objectives of low cost and ease of servicing. Difficulty has been encountered to ensure on-track registration when reproducing a material recorded on a different apparatus. The same applies to recorders of the type wherein special features are provided which include slow-motion, fast-motion and frame freeze reproduction. In such recorders use is made of a head moving mechanism which moves the head in a direction transverse to the length of track in response to an error signal representing the deviation of the head from the intended track.

To overcome this problem, one current approach involves the use of a pilot signal generator for generating pilot signals having different frequencies and recording the pilot signals on different tracks, and an envelope detector for detecting the envelope of the pilot signals to derive a tracking control signal therefrom. However, the pilot signal generator adds to the complexity and cost of the equipment and tends to interfere with desired signals.

Another approach is to record a frequency-modulated video signal and to oscillate the video head transeversely at a frequency 480 Hz during playback to cause variations in the FM signal to extract a tracking control signal from such variations. However, this approach still suffers from a drawback in that the FM signal variations appear at the output of a frequency demodulator as a noise.

SUMMARY OF THE INVENTION

In a recording apparatus of the type having a transducer head which scans a recording medium along each of a plurality of tracks, an information signal is frequency-modulated upon carriers of different frequencies to generate a series of frequency-modulated different frequency carriers each of which occurs in synchronism with the shifting of the transducer head from one track to the next. The modulated carriers are serially applied to the head to record each of the different frequency carriers on a different track of the recording medium, so that there is a difference in frequency between carriers recorded on adjacent tracks. During playback, the frequency-modulated carriers are sequentially reproduced and separated into different frequency carrier components according to different tracks. The carrier components are fed to frequency demodulators to be demodulated respectively, and sequentially combined to regenerate the original information signal. The invention allows tracking control to be effected on the transducer head in response to at least one of the individual carriers which are derived from tracks on either side of the track being scanned.

Preferably, the tracking control signal is derived from those carriers which are in turn derived from opposite sides of the intended track by detecting the difference in amplitude therebetween.

BRIEF DESCRIPTION OF THE DRAWINGS

The present invention will be described in further detail with reference to the accompanying drawings, in which.

DETAILED DESCRIPTION

Figure 1:
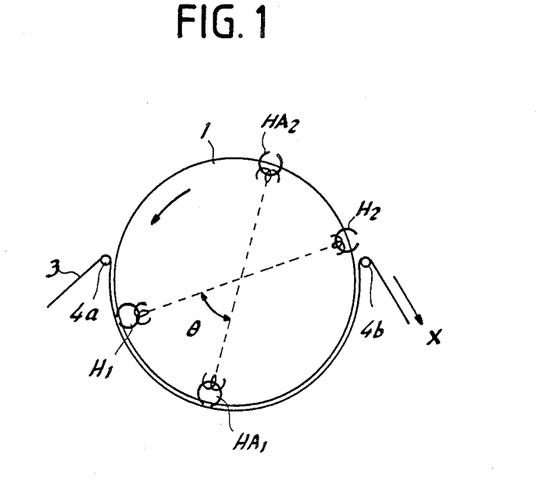
FIG. 1 is a plan view illustrating a recording head assembly of a magnetic tape recording apparatus.
Figure 2:
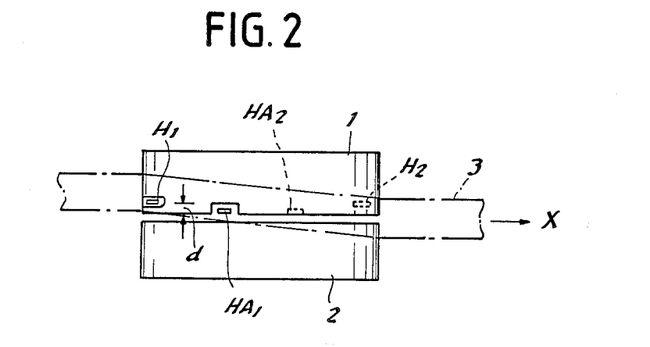
FIG. 2 is a side elevational view of the recording head assembly of FIG. 1.

Referring now to FIGS. 1 and 2, there is shown a helical scan magnetic tape recording head assembly is schematically illustrated. The assembly includes a pair of video transducer heads $H_1$ and $H_2$ mounted in diametrically opposite positions of the circumference of an upper rotary drum 1 which is rotatably and coaxially mounted on a lower stationary drum 2. Also mounted on the circumference of the rotary drum 1 is a pair of audio transducer heads $HA_1$ and $HA_2$ in diametrically opposite positions advanced by angle $\theta$ from the video heads $H_1$ and $H_2$, respectively. A magnetic tape 3 is looped around an arc somewhat greater than a 180° arc by means of a pair of guide posts 4a and 4b in such an orientation that each of the video and audio heads makes a helical pass over a section of the tape 3 which is transported in the direction X as the drum 1 is rotated counterclockwise to record video (field) and sound signals along a common track skewed relative to the length of the tape. Video heads $H_1$ and $H_2$ are located a distance d higher than audio heads $HA_1$ and $HA_2$ as shown in FIG. 2 so that video and audio heads $H_1$ and $HA_1$ form a pair that makes contact with the tape at substantially the same time and heads $H_2$ and $HA_2$ form another pair that makes contact with it substantially the same time during each helical scan. Typically, with a rotary drum having a diameter of 62 mm, the angle of advance $\theta$ and the vertical spacing d are 55° and 18 micrometers, respectively.

Preferably, video heads $H_1$ and $H_2$ are oriented so that their azimuths, or vertical settings of head gaps have +6° and −6° inclinations, respectively, and audio heads $HA_1$ and $HA_2$ are oriented so as to provide a greater angular difference therebetween than is provided between video heads $H_1$ and $H_2$. Suitable azimuths for audio heads $HA_1$ and $HA_2$ are −30° and +30°, respectively. These angular relationships minimize mutual interference between audio signals and interference between audio and video signals. The video and audio heads are mounted respectively on a head moving mechanism which is preferably comprises a bimorph element responsive to a electrical signal applied thereto to contract or expand to minimize lateral displacement of the head from the right track.

Figure 3:
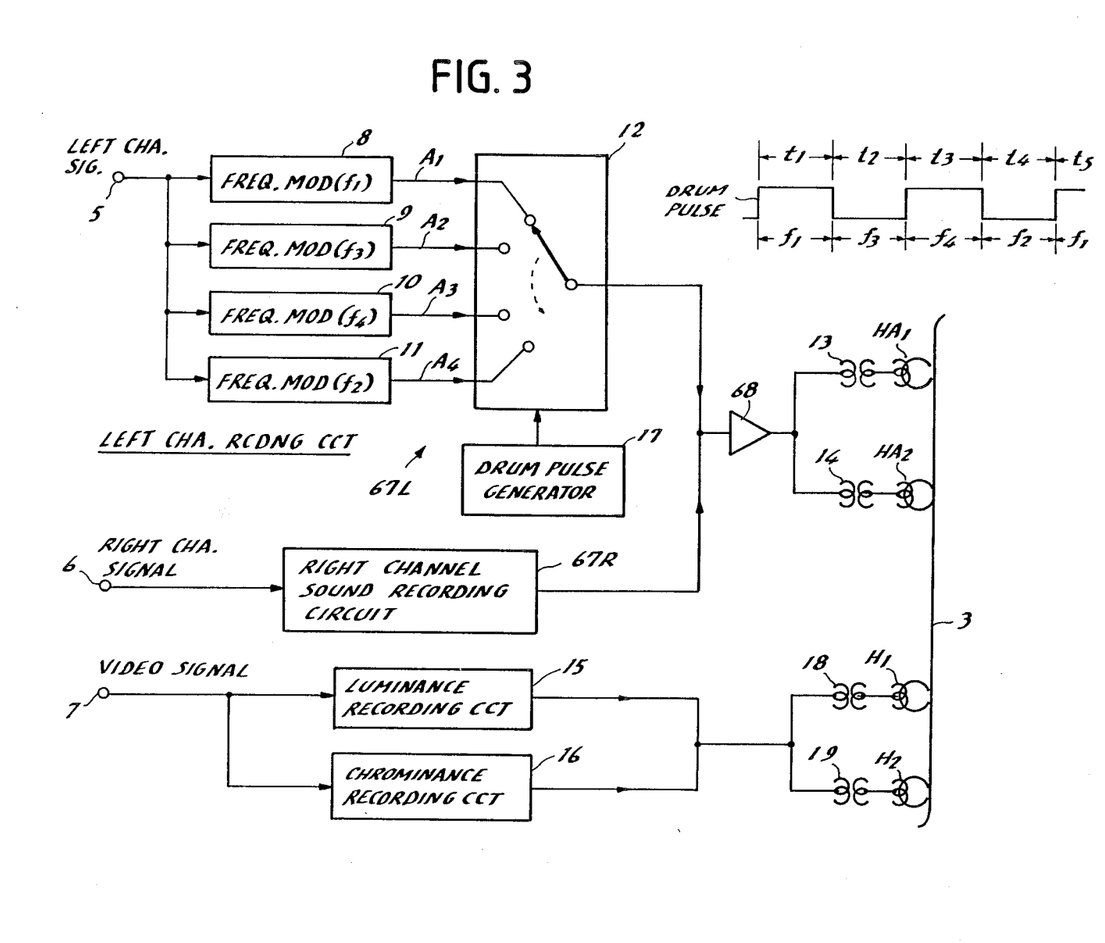
FIG. 3 is a block diagram of the recording circuit of an embodiment of the invention.

In FIG. 3, the video and audio recording circuitry of an embodiment of the present invention is shown. The recording circuit generally comprises a left-channel sound recording section 67L, a right-channel sound recording circuit 67R, and a conventional video recording section including a luminance recording circuit 15 and chrominance recording circuit 16. Left- and right-channel audio signals are applied to terminals 5 and 6, respectively, of the left- and right-channel audio recording circuits and a video signal is applied to terminal 7. The video input to the terminal 7 is a standard color television signal which is separated in frequency between luminance and chrominance components in respective recording circuits 15 and 16. In the luminance recording circuit 15 the input signal is modulated in frequency upon a carrier with such a frequency shift that the sync tip level corresponds to 3.4 MHz and the white peak level corresponds to 4.4 MHz. The luminance input is modulated upon a 629 kHz color subcarrier and phase-shifted for purposes of minimizing crosstalk in a manner known in the art. The frequency-division multiplexed luminance and chrominance signals are fed to video heads $H_1$ and $H_2$ by way of rotary transformers 18 and 19.

The left-channel sound recording circuit 67L comprises a set of four frequency modulators 8, 9, 10 and 11, and an electronic rotary switch or analog multiplexer 12. The left-channel audio signal is modulated in frequency with a frequency shift of ±100 kHz by frequency modulators 8, 9, 10 and 11 upon carriers having frequencies $f_1$, $f_3$, $f_4$ and $f_2$, respectively, to generate a set of four frequency-modulated outputs $A_1$, $A_2$, $A_3$ and $A_4$. In a preferred embodiment, frequencies $f_1$, $f_2$, $f_3$ and $f_4$ are 1.1 MHz, 1.35 MHz, 1.6 MHz and 1.85 MHz, respectively. A drum pulse generator 17 generates a pulse in response to each revolution of the rotary drum 1 and feeds the pulse to rotary switch 12 to sequentially couple the FM audio signals $A_1$, $A_2$, $A_3$, $A_4$ to a recording amplifier 68 in response to each transducer head being shifted from one track to the next.

Figure 4:
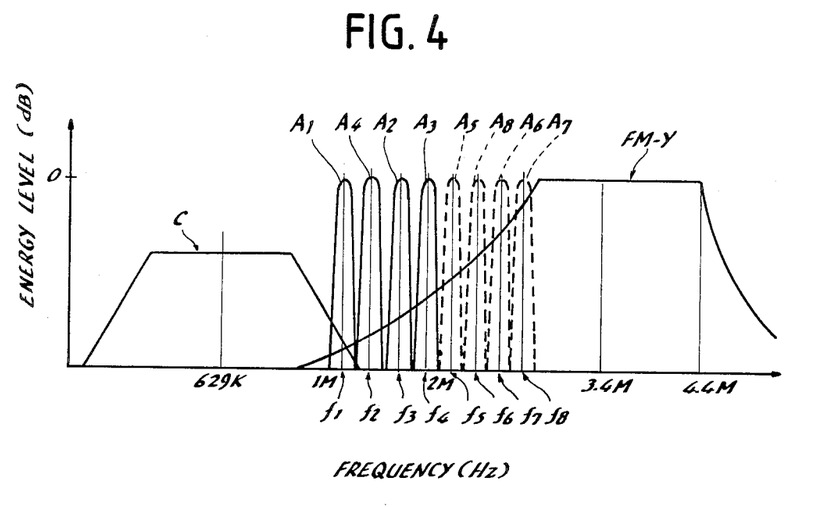
FIG. 4 is an illustration of the energy distribution of the video and audio signal components over the video frequency spectrum.

As shown in FIG. 4, the left- and right-channel FM audio signals span a range of frequencies lying between the frequency-modulated luminance signal FM-Y on the higher frequency end of the spectrum and the chrominance signal C on the lower frequency end.

Amplifier 68 strengthens the input signals to a level sufficient to magnetize the recording medium to saturation. Similarly, the frequency-modulated luminance signal is amplified to a level sufficient to cause magnetic saturation. The chrominance signal is, however, amplified to a level insufficient to cause saturation.

As will be described later, FM audio signals are recorded prior to the recording of video signals. Because of their high amplification and long wavelengths relative to the luminance signal, the audio signals are recorded in a region as deep as 1 micrometer from the surface. Due to the short wavelengths in comparison with the FM audio signals, the luminance signal magnetizes a shallower region of the tape which is typically 0.2 to 0.3 micrometers from the surface. Although the chrominance signal has shorter wavelengths than the FM audio signals, the below-the-saturation level amplification does not permit it to reach the deeper area. Thus, video components are recorded in a shallower region of the magnetic tape and audio signals are buried underneath. The audio and video heads are arranged so that audio and video signals are almost simultaneously but respectively recorded on adjacent tracks with the video track being displaced by one track pitch in the direction of tap motion from the audio track. In the illustrated embodiment, the track pitch equals the track width.

Figure 5:
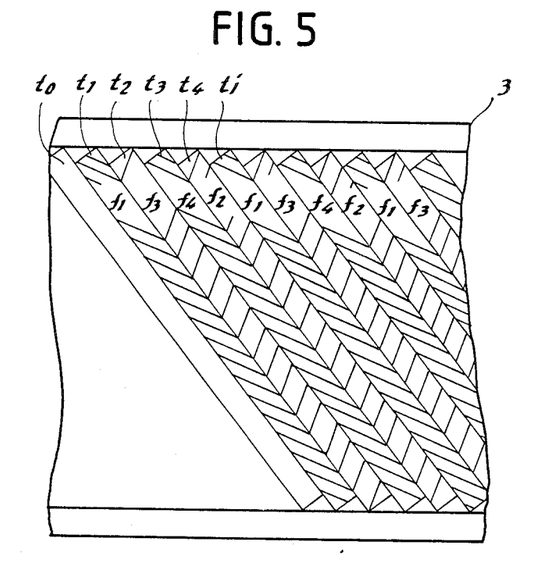
FIG. 5 is an illustration of a track pattern according to an embodiment of the invention.

Audio signal is recorded as follows. For convenience it is assumed that audio recording begins with signal $A_1$ through head $HA_1$. Audio head $HA_1$ scans a track $t_1$, while video head $H_1$ scans a track $t_0$ displaced one track from $t_1$ with no guard band in the direction of tape motion, FIG. 5. Signal $A_2$ is recorded on track $t_2$ through head $HA_2$ and video signal is recorded through head $H_2$ on the upper area of track $t_1$ below which audio signal $A_1$ is recorded. Likewise, signal $A_3$ is recorded on track $t_3$ through head $HA_1$ and video signal is recorded on the upper area of track $t_2$ overlapping sigal $A_2$, and signal $A_4$ is recorded on track $t_4$ through head $HA_2$ while video signal is recorded on the upper area of track $t_3$ overlapping signal $A_3$. In this way, audio signals $A_1$ to $A_4$ are recorded on tracks $t_1$ to $t_4$, respectively, while video signal is recorded on the upper regions of tracks $t_0$ to $t_3$. This track pattern recyclically repeats during subsequent recording. It will be noted that there is a frequency difference of 0.5 MHz on one side of each track and a difference of 0.25 MHz on the other side. The track-to-track frequency variation is utilized advantageously for both audio and video tracking control purposes during playback operation which will be described hereinbelow with reference to FIG. 6. In FIG. 5, illustrated at TA and TC are portions of the tape which are used for recording audio signals with stationary heads in conventional manner and recording control signals, respectively.

Figure 6:
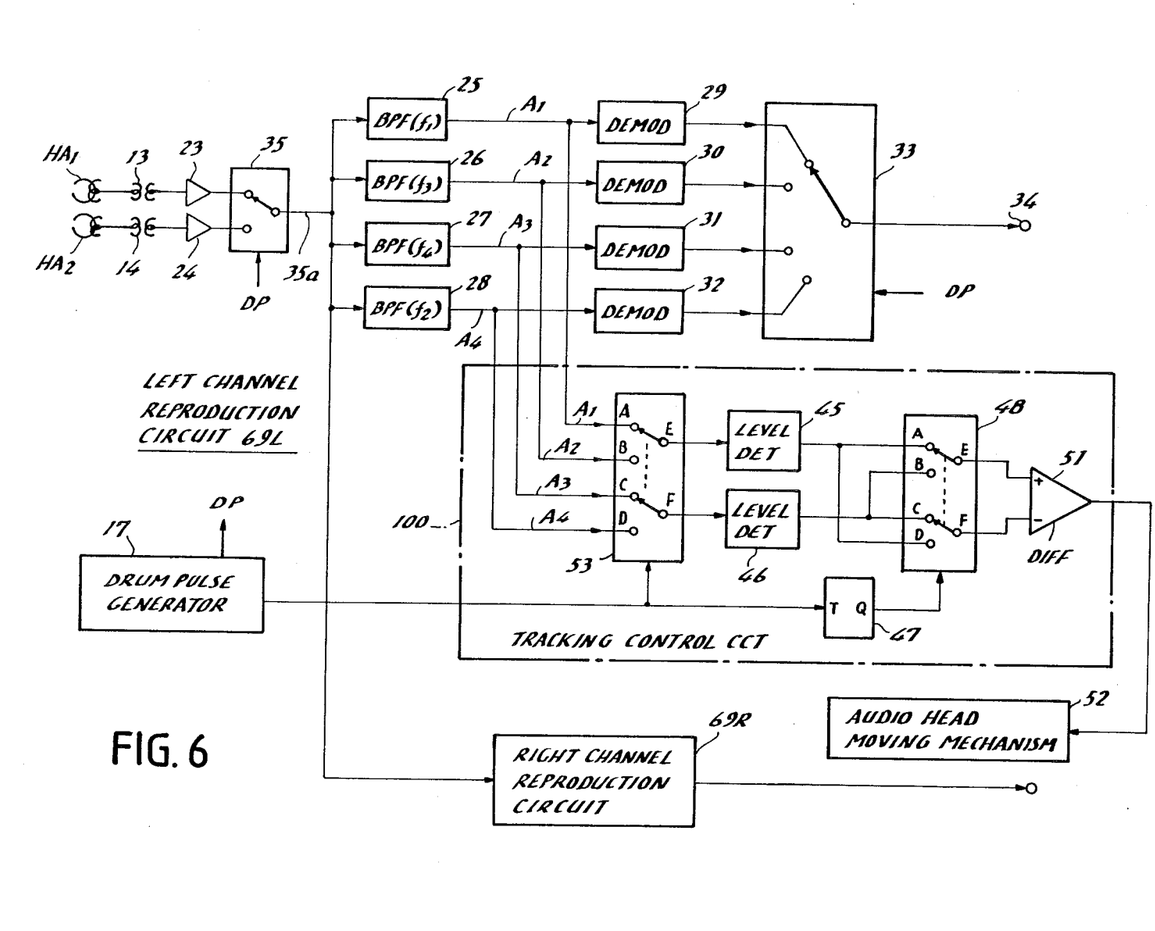
FIG. 6 is a block diagram of a sound reproduction circuitry.

In FIG. 6, an audio reproduction circuit is illustrated. Because of the difference in azimuth between heads $HA_1$ and $HA_2$, audio signals $A_1$ and $A_3$ are exclusively detected by head $HA_1$ and signals $A_2$ and $A_4$ are exclusively detected by head $HA_2$. The detected audio signals are fed through rotary transformers 13, 14 and playback amplifiers 23, 24 to an electronic switch 35. Switch 35 alternately couples signals $A_1$ to $A_4$ to an output lead 35a in response to drum pulses. This switching eliminates the components which briefly overlap between adjacent tracks due to the longer tape length that is wound on the circumference of rotary drum 1 than the period of one video field. The output of switch 35 is connected to a left-channel reproduction circuit 69L and to a right-channel reproduction circuit 69R.

The left-channel circuit 69L comprises a set of four band-pass filters 25, 26, 27 and 28 having passbands of frequencies $f_1$, $f_3$, $f_4$ and $f_2$, respectively. These band-pass filters separate the sequential FM audio carriers into individual carrier components $A_1$, $A_2$, $A_3$ and $A_4$ which are demodulated by frequency demodulators 29, 30, 31, 32, respectively. The demodulated carrier components are sequentially combined by means of an electronic rotary switch 33 in response to drum pulses to recover the original audio signal which is fed to an output terminal 34.

The outputs of the band-pass filters 25, 26, 27, 28 are further applied to a tracking control circuit 100. The control circuit 100 includes an electronic switch 53 having four input terminals A, B, C, D and two output terminals E, F which are simultaneously respectively coupled to input terminals A and C and switched to terminals B and D in response to a drum pulse. The output terminals E and F of switch 53 are connected to level detectors 45 and 46, respectively. The output of detector 45 is connected to input terminals A and D of an electronic switch 48, the output of detector 46 being connected to input terminals B and C of switch 48. Switch 48 has output terminals E and F which are respectively coupled to terminals A and C and switched to terminals B and D in response to a switching pulse supplied from a T flip-flop 47 which takes its input from the drum pulse generator 17, whereby switch 48 remains switched to the A and B positions when tracks $t_4$ and $t_1$ are successively scanned and remains switched to the C and D positions when tracks $t_2$ and $t_3$ are successively scanned. The output terminals E and F of switch 48 are connected to the positive and negative inputs of a differential amplifier 51, respectively, the differential output of which is coupled to the audio head moving mechanism 52 on which the audio heads $HA_1$ and $HA_2$ are located.

The operation of the tracking control circuit 100 is as follows. Assume that head $HA_2$ is scanning track $t_2$ to provide signal $A_2$ which is detected by band-pass filter 26, recovered by frequency demodulator 30 and fed to output terminal 34. Due to crosstalk, head $HA_2$ picks up carrier components $A_1$ and $A_3$ from adjacent tracks $t_1$ and $t_3$ in addition to carrier component $A_2$. Since these crosstalk components are undesirable for normal sound reproduction, only the desired component $A_2$ is allowed to pass through band-pass filter 26. However, the crosstalk components $A_1$ and $A_3$ are utilized for tracking control purposes as follows.

Crosstalk components $A_1$ and $A_3$ are coupled by switch 53 to level detectors 45 and 46, respectively, where their amplitudes are detected and fed to the input terminals of switch 48. The output terminals E and F of switch 48 are now in connection to its A and C input terminals to apply signals $A_1$ and $A_3$ to the positive and negative inputs of differential amplifier 51 respectively to provide an error voltage to the moving mechanism 52.

The operation of the tracking control circuit 100 is as follows. It is assumed that audio heads tend to deviate in the direction of tape motion and head $HA_2$ is following track $t_2$ with a deviation toward track $t_1$. In this instance, carriers $A_1$ and $A_3$ are the crosstalk components which are to be compared with each other and switches 53 and 48 are both in the A and C positions.

With the deviation toward track $t_1$, carrier $A_1$ is stronger than carrier $A_3$ at the inputs to differential amplifier 51 and a positive error voltage is generated to cause the head moving mechanism 52 to move the head $HA_2$ away from track $t_1$.

When audio head $HA_1$ takes turn to scan the next track $t_3$, carriers $A_2$ and $A_4$ are the crosstalk components to be compared. Switch 53 is changed to positions B and D, while switch 48 stays in the A and C positions, so that carrier components $A_2$ and $A_4$ are applied to the positive and negative inputs of differential amplifier 51 respectively. With a head displacement toward track $t_2$, signal $A_2$ is stronger than signal $A_4$ and a positive error voltage will be generated for correcting the path of head $HA_1$ in a direction away from track $t_2$ toward track $t_3$.

When audio head $HA_2$ subsequently scans track $t_4$, carrier components $A_3$ and $A_1$ become the crosstalk components and switch 53 returns to the A and C positions. Switch 48 is now changed to the B and D positions, whereby carrier components $A_3$ and $A_1$ are applied to the positive and negative inputs of differential amplifiers 51, respectively. With head $HA_1$ still tending to deviate in the direction of tape motion, i.e. toward track $t_3$, signal $A_3$ is stronger than signal $A_1$ and a positive error signal will be developed.

When head $HA_1$ next scans track $t_1'$, carrier components $A_4$ and $A_2$ are the crosstalk components and switch 53 changes to positions B and D. Switch 48 stays in positions B and D to connect carrier components $A_4$ and $A_2$ to the positive and negative inputs of differential amplifier 51. With a displacement toward track $t_4$, signal $A_4$ is greater than signal $A_2$ and a positive error signal is generated.

A negative error voltage will thus be generated during each track scan if the head deviates in a direction opposite to the direction of tape motion to reduce the displacement substantially to zero.

Figure 7:
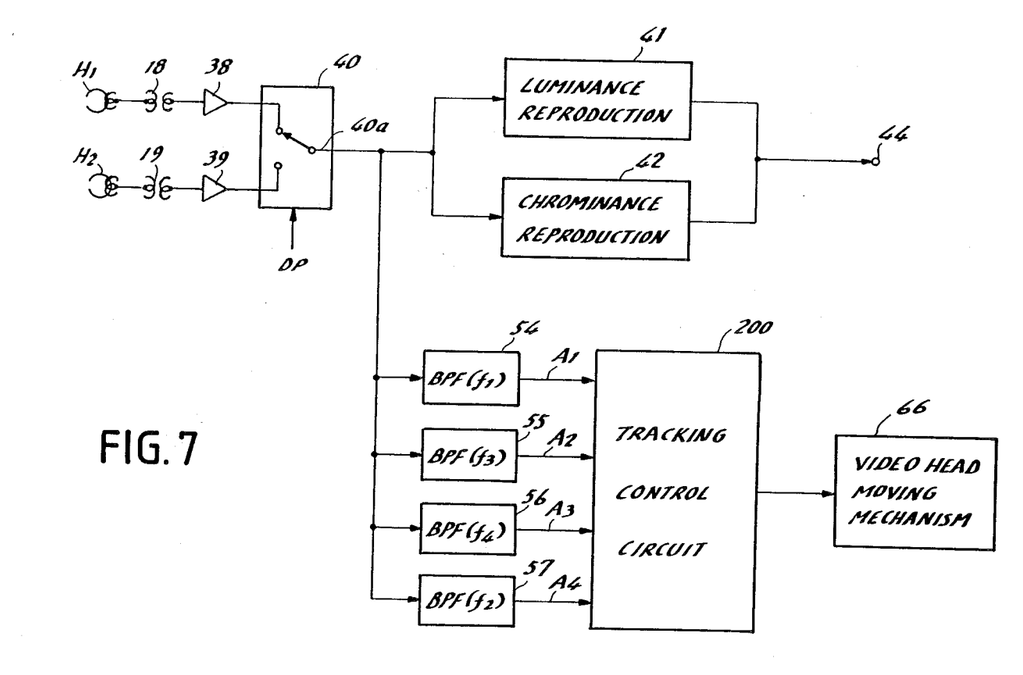
FIG. 7 is a block diagram of a video reproduction circuitry.

FIG. 7 is an illustration of a video reproduction circuit according to the present invention. This circuit comprises an electronic switch 40 having two inputs coupled respectively to video heads $H_1$ and $H_2$ through playback amplifiers 38 and 39 to alternately couple the video signals to an output terminal 40a. The output terminal 40a is connected to luminance and chrominance reproduction circuits 41 and 42 of a well known design for converting the frequency-divided luminance and chrominance signals to the original signals. The output terminal 40a is also connected to band-pass filters 54, 55, 56 and 57 which are tuned to frequencies $f_1$, $f_3$, $f_4$, $f_2$, respectively, for separating FM audio carrier components, which are detected by video heads together with the video signals, into different frequency components $A_1$, $A_2$, $A_3$, $A_4$. The circuitry includes a video tracking control circuit 200 identical to the audio tracking control circuit 100 used in the circuitry of FIG. 6. The separated audio signals are fed to the video tracking control circuit 200 to effect tracking control on the video heads by deriving an error voltage in the same manner as in circuit 100 and applying it to a video head moving mechanism 66 on which the video heads are mounted.

Figure 8A:
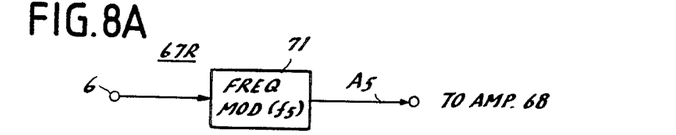
FIGS. 8A and 8B are illustrations of a first example of the right-channel recording and reproduction circuits, respectively.

FIG. 8A illustrates one example of the right-channel sound recording circuit 67R. In this example, the circuit 67R comprises a single frequency modulator 71 as opposed to the multiple frequency modulator configuration of the left-channel sound recording circuit 67L. The right-channel signal is modulated upon a carrier having a frequency $f_5$ which is typically 2.1 MHz. The frequency-modulated right-channel signal, designated $A_5$, is combined in the amplifier 68 with the left-channel signal and fed through rotary transformers 13, 14 to audio heads $HA_1$ and $HA_2$.

Figure 8B:
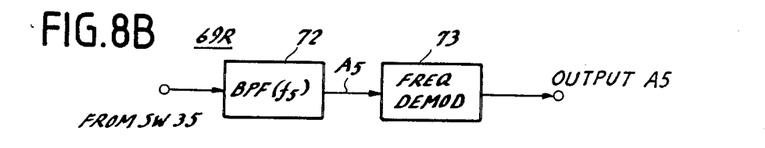

FIG. 8B shows one example of the right-channel reproduction circuit 69R which is used in conjunction with the circuit of FIG. 8A. In FIG. 8B, the circuit 69R comprises a band-pass filter 72 and a frequency demodulator 73 connected in a series circuit. The band-pass filter 72 is tuned to frequency $f_5$ which is 2.1 MHz to pass the signal $A_5$ which has been derived from the frequency modulator 71, FIG. 8A.

Figure 9A:
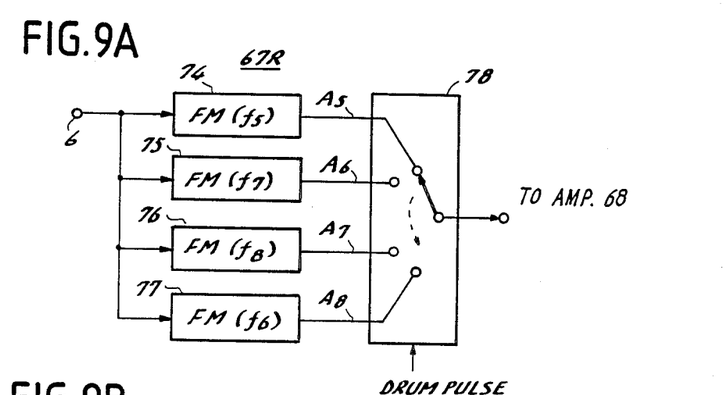
FIGS. 9A and 9B are illustrations of a second example of the right-channel recording and reproduction circuits, respectively.

FIG. 9A is an illustration of another example of the right-channel sound recording circuit 67R of FIG. 3. This circuit is generally similar to the left-channel sound recording circuit 67L in that it comprises frequency modulators 74, 75, 76 and 77 which frequency-modulate carriers having frequencies $f_5$ (=2.1 MHz), $f_7$ (=2.6 MHz), $f_8$ (=2.85 MHz) and $f_6$ (=2.35 MHz), respectively, with the right-channel audio signal to generate frequency-modulated audio signals $A_5$, $A_6$, $A_7$ and $A_8$. These frequency-modulated audio signals are fed to respective input terminals of an electronic rotary switch 78 to multiplex the input signals in sequence in response to drum pulses applied thereto. Thus, a first set of frequency-modulated audio signals having carrier frequencies $f_1$ to $f_4$ and a second set of frequency-modulated audio signals having carrier frequencies $f_5$ to $f_8$ are generated in the circuits 67L and 67R, FIG. 3, and combined in the recording amplifier 68 and recorded as a frequency-division multiplexed signal on magnetic recording medium. The frequency-modulated audio signals $A_5$–$A_8$ appear in the frequency spectrum as indicated by dotted lines in FIG. 5.

Figure 9B:
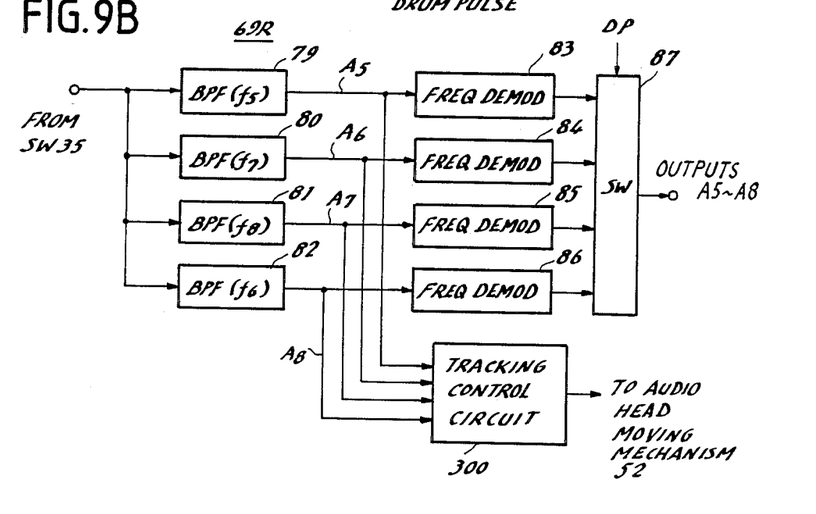

The right-channel sound reproduction circuit 69R shown in FIG. 9B is used in the circuitry of FIG. 6 in conjunction with the recording circuit of FIG. 9A. The FM audio signal with sequentially varying frequencies is separated into individual components $A_5$ to $A_8$ by band-pass filters 79, 80, 81 and 82 tuned to frequencies $f_5$, $f_7$, $f_8$, $f_6$ respectively, fed to frequency demodulators 83, 84, 85, 86 respectively and applied to a rotary switch 87 to be multiplexed into a sequential signal for application to the audio heads. Preferably, the outputs of band-pass filters 79-82 are fed to a second audio tracking control circuit 300 identical to the first audio tracking circuit 100. The arrangements of FIGS. 9A and 9B are preferred when a higher degree of precision control and a higher degree of crosstalk separation are desired.

Figures 10, 10A:
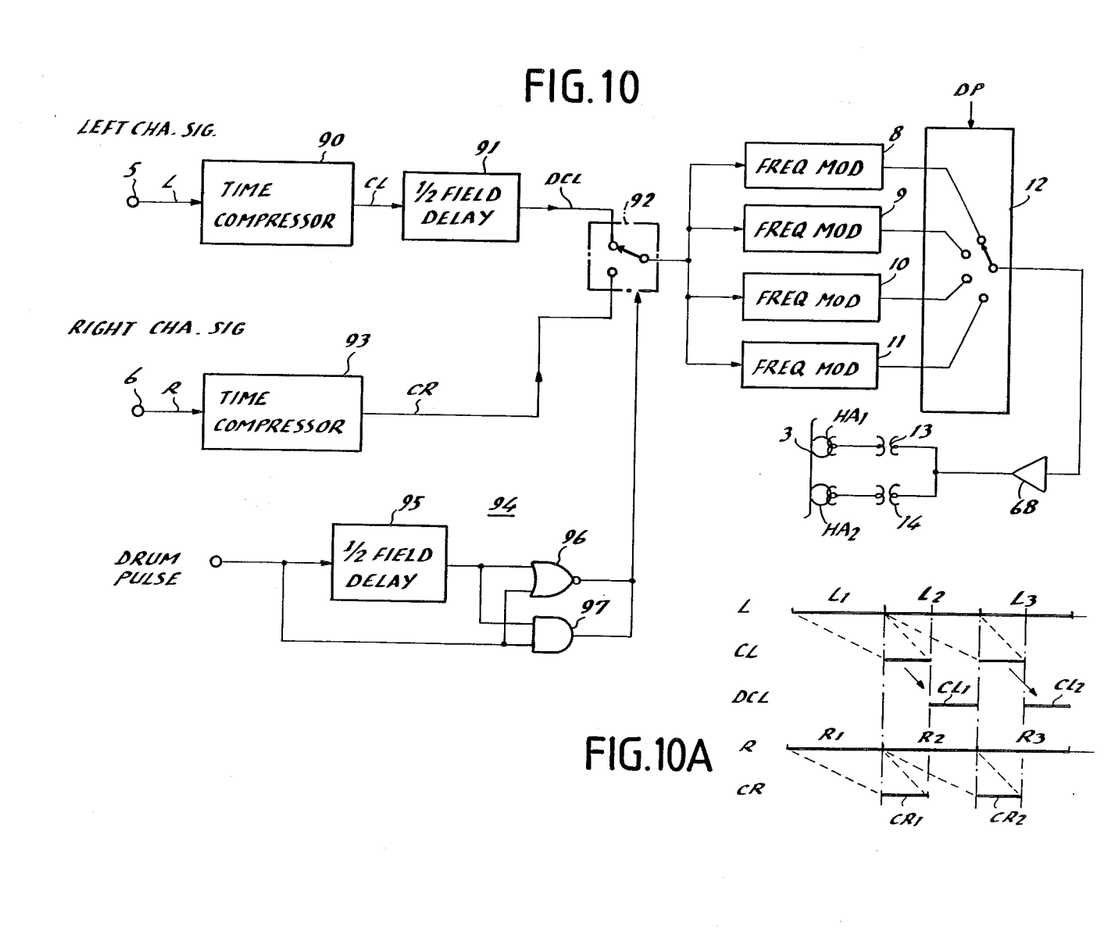
FIGS. 10 and 10A are illustrations of another embodiment of the invention for providing time division multiplexing of stereophonic signals.
Figure 11:
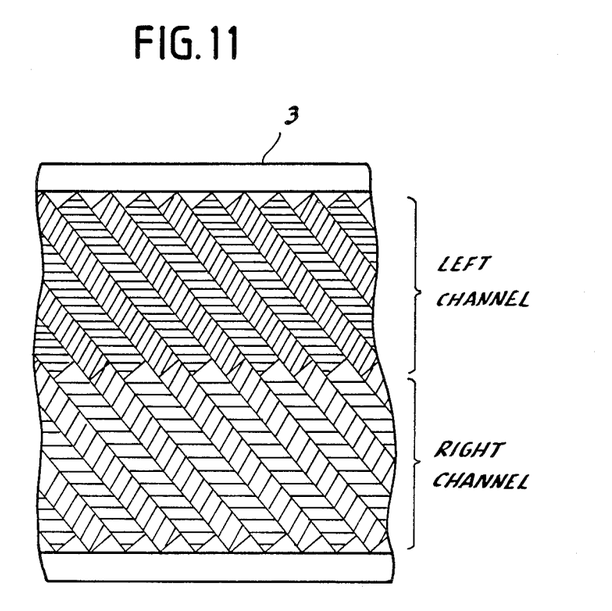
FIG. 11 is an illustration of a track pattern recorded according to the circuitry of FIG. 10.

In FIG. 10 is shown another embodiment of the present invention in which parts corresponding to those in FIG. 3 are indicated by the same numerals as used in FIG. 3. In this embodiment, left- and right-channel audio signals L and R are recorded in a time-division multiplexed format along each track by time-compressing the both channel signals into one-half the original and recording the time-compressed right-channel signal CR onto a first half section of each track and recording the time-compressed left-channel signal CL onto a second half section of the track as schematically shown in FIG. 11.

To this end, the sound recording circuit includes a left-channel time compressor 90 which typically comprises a charge-coupled device and a control circuit that determines the clock rate of the CCD. The time-compressed left-channel signal CL is delayed by one-half the field interval in a delay circuit 91, the delayed signal DCL being coupled to an input of a switch 92 through which it is applied to frequency modulators 8 to 11. The right-channel signal R is fed to a right-channel time compressor 93 identical in construction to time compressor 90, the compressed right-channel signal CR being coupled to a second input of switch 92 and through which it is fed to the frequency modulators 8-11. The switch 92 alternately couples the signals DCL and CR alternately in response to a control signal applied thereto from a frequency doubler 94. Frequency doubler 94 comprises a ½ field delay circuit 95, a NOR gate 96 and an AND gate 97. The ½ field delay 103 introduces a delay time of one-half the field interval to drum pulses, the delayed drum pulses being fed to NOR gate 96 and AND gate 97 to each of which nondelayed drum pulse is also applied. The outputs of the gates 96 and 97 are combined to produce a pulse train signal having a repetition frequency twice as high as the drum pulse. The output of switch 92 is a sequence of compressed right- and left-channel signals CR and CL which are frequency modulated upon respective carriers in a manner as described in FIG. 3 and fed to switch 12 which sequentially couples the frequency-modulated signals to amplifier 68 and thence to audio heads $HA_1$, $HA_2$ in response to each head being shifted from one track to the next. Therefore, left-channel signal components $L_1$ and $L_2$ are compressed respectively into components $CL_1$ and $CL_2$, as shown at FIG. 10A, and delayed for ½ field interval in succession so that delayed components $CL_1$ and $CL_2$ appear respectively in the second half periods of the field intervals occupied by the original left-channel components $L_2$ and $L_3$ and the right-channel components $R_1$ and $R_2$ appear in the first half period of the same field intervals.

Since the frequency modulators 8–11 are commonly shared by left- and right-channel signals, the frequency modulated components fall in the same frequency range occupied by the frequency modulated signals $A_1$ to $A_4$ of the embodiment of FIG. 3. Thus, the time-division multiplexing relaxes the bandwidth requirement for audio signals.

Figures 12, 12A:
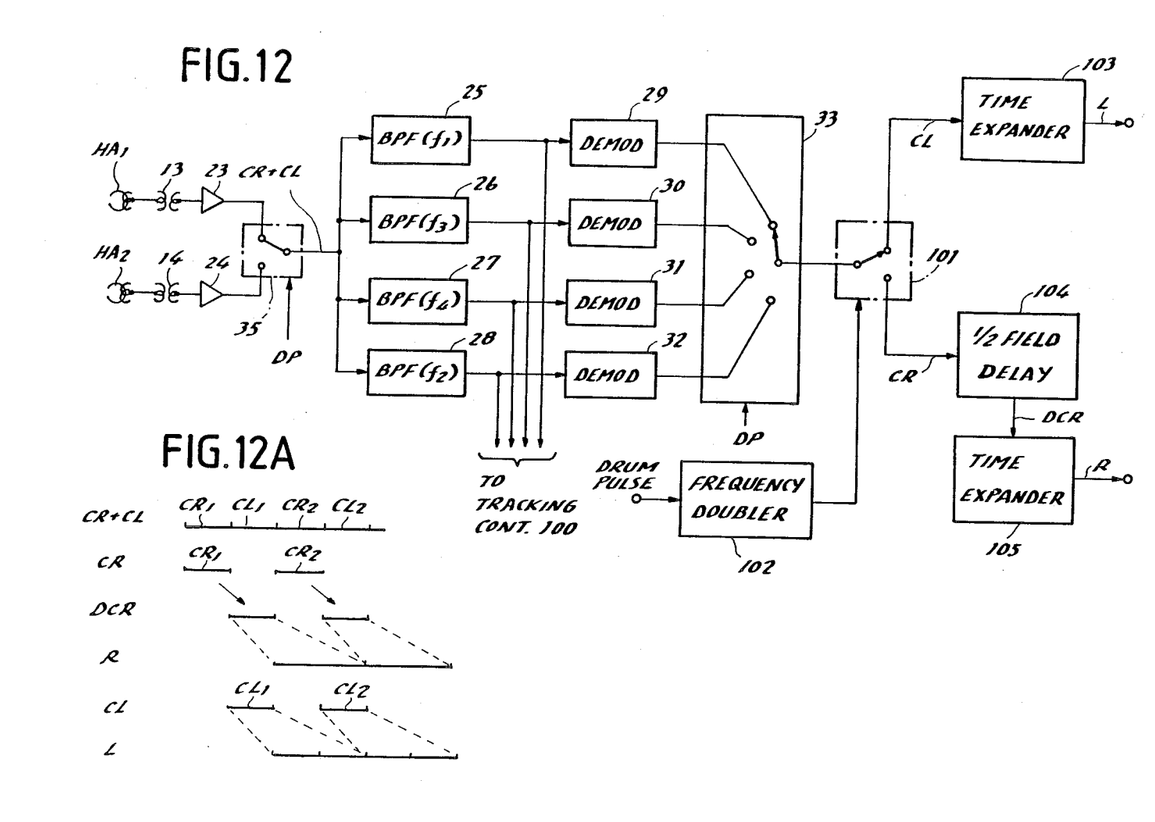
FIG. 12 is a block diagram for demultiplexing the time-division multiplexed signals.
FIG. 12A is a timing diagram for describing the operation of this circuitry.

FIG. 12 is an illustration of the circuitry for reproducing the time-compressed audio signals, in which parts corresponding to those in FIG. 6 are marked with the same reference numerals as used therein and the description thereof being omitted for brevity. Additionally included in this circuitry is a demultiplexing switch 101 which is connected to the output of switch 33. The sequentially combined time-compressed signals CR plus CL are separated into different frequency components by band-pass filters 25-28 and applied respectively to frequency demodulators 29-32 on the one hand and to tracking control circuit 100 on the other. The frequency demodulated signals right- and left-channel compressed siginals CR, CL derived from each track are selected by switch 33 and fed to switch 101. This switch is operated in response to an output signal from a frequency doubler 102 identical to that shown in FIG. 10. The compressed signals CL and CR on each track are separated from each other by switch 101 and respectively applied to a left-channel time expander 103 and to a ½ field delay 104 which delays the compressed right-channel signal for one-half the field interval and feeds its output to a right-channel time expander 105. Each of the time expanders comprises a charge coupled device and a control circuit that operates in a manner inverse to the time compressors 90 and 93.

As shown in FIG. 12A, the time compressed right-channel components $CR_1$ and $CR_2$ are thus delayed and time-expanded so that component $CR_1$ appears in the same interval as the original time compressed components $CR_2$ and $CL_2$ appear, and the time-compressed left-channel components $CL_1$ and $CL_2$ are expanded to appear in the same interval in which the expanded right-channel components $CR_1$ and $CR_2$ appear.

In the foregoing description, the tracking control circuit utilizes the different frequency components which are derived from opposite sides of a given track. The present invention could be modified to allow the transducer head to follow a desired track by utilizing the signal derived from an adjacent track scanned immediately prior to the desired track. This is particularly advantageous for tracking control during recording modes.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A magnetic recording and/or reproducing apparatus having a transducer head mounted on a rotary drum, wherein a magnetic tape is wound on an arc section of the circumference of said rotary drum to allow said head to scan a track skewed relative to the length of the tape upon rotation of said drum, said tape being moved in a predetermined relationship with the speed of rotation of said drum to cause said head to successively shift to the next track, comprising:

means for modulating the frequencies of different frequency carriers with an audio signal and for generating a series of frequency-modulated carriers, each of which occurs in synchronism with the shifting of said transducer head from one track to the next and for applying said series of frequency-modulated carriers to said head to record each of said different frequency carriers on a different track, so that there is a difference in frequency between the carriers recorded on tracks on opposite sides of each track;

filter means for separating frequency-modulated carriers detected by said head into different frequency components;

head control means for controlling said head to move in a direction transverse to the direction of scan in resonse to the separated frequency components which are derived from tracks on opposite of each track; and further comprising a second transducer head mounted on said rotary drum so that the second head follows each of said tracks in which said audio signal is recorded, said second head being oriented with an angle of inclination to a reference differing from an angle of inclination of the first-mentioned head to said reference, and means for modulating a video signal upon a carrier having a frequency differing from the frequencies of said carriers being said audio signal and applying the modulated video signal to said second head so that said modulated video signal is recorded in an area overlying the area in which said audio signal is recorded.

2. A magnetic recording and/or reproducing apparatus as claimed in claim 1, wherein said frequency modulating means is arranged to modulate the frequencies of first, second, third and fourth different frequency carriers with said audio signal and generating a series of first, second, third and fourth frequency-modulated carriers for application to said head.

3. A magnetic recording and/or reproducing apparatus as claimed in claim 1, further comprising means for separating a series of audio signal bearing frequency-modulated carriers detected by said second head into different frequency components, and second head control means for controlling said second head in a direction transverse to the direction of scan in response to those different frequency components which are detected from tracks on opposite sides of the track which is being scanned by said second head.

4. A magnetic recording and/or reproducing apparatus as claimed in claim 3, wherein said second head control means comprises means for detecting the difference in amplitude between the different frequency components detected from said opposite side tracks and generating a tracking control signal indicative of the amount and direction of deviation of said second head from said scanned track, and means for moving said second head in response to said tracking control signal to reduce said deviation.

5. A magnetic recording and/or reproducing apparatus as claimed in claim 1, wherein said tracks are clossely spaced apart without guard bands therebetween.

6. A magnetic recording and/or reproducing apparatus having a transducer head mounted on a rotary drum, wherein a magnetic tape is wound on an arc section of the circumference of said rotary drum to allow said head to scan a track skewed relative to the length of the tape rotation of said drum, said tape being moved in a predetermined relationship with the speed of rotation of said drum to cause said head to successively shift to the next track, comprising:

means for modulating the frequencies of different frequency carriers with an audio signal and for generating a series of frequency-modulated carriers, each of which occurs in synchronism with the shifting of said transducer head from one track to the next and for applying said series of frequency-modulated carriers to said head to record each of said difference frequency carriers on a differenct track, so that there is a difference in frequency between the carriers recorded on tracks on opposite sides of each track;

filter means for separating frequency-modulated carriers detected by said head into different frequency components;

head control means for controlling said head to move in a direction transverse to the direction of scan in response to the separated frequency components which are derived from tracks on opposite sides of each track;

wherein said head control means comprises means for detecting a difference in amplitude between said different frequency components detected from said opposite sides and for generatng a tracking control signal indicative of an amount and direction of deviation of said head from said scanned track, and means for moving said head in response to said tracking control signal to reduce said deviation, and wherein said filter means comprises first, second, third and fourth band-pass filter means for separating a series of frequency-modulated carriers detected by said head into first, second, third and fourth different frequency components, wherein said head control means comprises a differential amplifier having a first and a second input terminal for generating said tracking control signal, and coupling means for coupling said first and third freqency components to said first and second input terminals respectively when said head scans a first track, coupling said second and fourth frequency components to said first and second terminals respectively when said head subsequently scans a second track, coupling said first and third frequency components to said second and first input terminals respectively when said head subsequently scans a third track and coupling said second and fourth components to said second and first input terminals respectively when said head subsequently scans a fourth track.

7. A magnetic recording and/or reproducing apparatus having a transducer head mounted on a rotary drum, wherein a magnetic tape is wound on an arc section of the circumference of said rotary drum to allow said head to scan a track skewed relative to the length of the tape upon rotation of said drum, said tape being moved in a predetermined relationship with the speed of rotation of said drum to cause said head to successively shift to the next track, comprising:

means for modulating the frequencies of different frequency carriers with an audio signal and for generating a series of frequency-modulated carriers, each of which occurs in synchronism with the shifting of said transducer head from one track to the next and for applying said series of frequecy-modulated carriers to said head to record each of said different frequency carriers on a different track, so that there is a difference in frequency between the carriers recorded on tracks on opposite sides of each track;

filter means for separating frequency-modulated carriers detected by said head into different frequency components;

head control means for controlling said head to move in a direction transverse to the direction of scan in response to the separated frequency components which are derived from tracks on opposite sides of each track; and further comprising a frequency modulator for modulating a second carrier with a second audio signal, said second carrier having a frequency differing from the frequencies of said carriers bearing the first-mentioned audio signal and applying the frequency-modulated second carrier to said head.

8. A magnetic recording and/or reproducing apparatus having a transducer head mounted on a rotary drum, wherein a magnetic tape is wound on an arc section of the circumference of said rotary drum to allow said head to scan a track skewed relative to the length of the tape upon rotation of said drum, said drum tape being moved in a predetermined relationship with the speed of rotation of said drum to cause said head to successively shift to the next track, comprising:

means for modulating the frequencies of different frequency carriers with an audio signal and for generating a series of frequency-modulated carriers, each of which occurs in synchronism with the shifting of said transducer head from one track to the next and for applying said series of frequency-modulated carriers to said head to record each of said different frequency carriers on a different track, so that there is a difference in frequency between the carriers recorded on tracks on opposite sides of each track;

filter means for separating frequency-modulated carriers detected by said head into different frequency components;

head control means for controlling said head to move in a direction transverse to the direction of scan in response to the separated frequency components which are derived from tracks on opposite sides of each track; and further comprising second frequency modulating means for modulating a second audio signal upon second carriers having different frequencies differing from the frequencies of said carriers bearing the first-mentioned audio signal for generating a second series of frequency-modulated carriers for application to said head in response to said head being shifted from one track to the next to record each of the carriers on a different track.

9. A magnetic recording and/or reproducing apparatus as claimed in claim 8, further comprising means for separating a series for frequency-modulated carriers bearing the second audio signal detected by said head into different frequency components, a plurality of second frequency demodulators for demodulating the last-mentioned different frequency components respectively, and means for sequentially combining the demodulated components.

10. A magnetic recording and/or reproducing apparatus as claimed in claim 9, further comprising second head control means for controlling said head in a direction transverse to the direction of track scan in response to those different frequency components of the carriers bearing said second audio signal which are detected by said head from tracks on opposite sides of the track which is being scanned by said head.

11. A magnetic recording and/or reproducing apparatus having a transducer head mounted on a rotary drum, wherein a magnetic tape is wound on an arc section of the circumference of said rotary drum to allow said head to scan a track skewed relative to the length of the tape upon rotation of said drum, said tape being moved in a predetermined relationship with the speed of rotation of said drum to cause said head to successively shift to the next track, comprising:

means for modulating the frequencies of different frequency carriers with an audio signal and for generating a series of frequency-modulated carriers, each of which occurs in synchronism with the shifting of said transducer head from one track to the next and for applying said series of frequency-modulated carriers to said head to record each of said different frequency carriers on a different track, so that there is a difference in frequency between the carriers recorded on tracks on opposite sides of each track;

filter means for separating frequency-modulated carriers detected by said head into different frequency components;

head control means for controlling said head to move in a direction transverse to the direction of scan in response to the separated frequency components which are derived from tracks on opposite sides of each track; and further comprising first time compressing means for compressing the time dimension of the first mentioned audio signal so that the compressed first audio signal exists for one half of the time period of each track, second time compressing means for compressing the time dimension of a second audio signal so that the compresed second audio signal exists for the other half of the time period of each track and means for alternately applying the outputs of said first and second time compressed audio signals to said frequency modulating means.

12. A magnetic recording and/or reproducing apparatus having a transducer head mounted on a rotary drum, wherein a magnetic tape is wound on an arc section of the circumference of said rotary drum to allow said head to scan a track skewed relative to the length of the tape upon rotation of said drum, said tape being moved in a predetermined relationship with the speed of rotation of said drum to cause said head to successively shift to the next track, comprising:

means for modulating the frequencies of different frequency carriers with an audio signal for generating a series of frequency-modulated carriers, each of which occurs in synchronism with the shifting of said transducer head from one track to the next and for applying said series of frequency-modulated carriers to said head to record each of said different frequency carriers on a different track, so that there is a difference in frequency between the carriers recorded on tracks on opposite sides of each track;

filter means for separating frequency-modulated carriers detected by said head into different frequency components;

head control means for controlling said head to move in a direction transverse to the direction of scan in response to the separated frequency components which are derived from tracks on opposite sides of each track; and further comprising first time expanding means for expanding the time dimension of a first audio signal applied thereto, second time expanding means for expanding the time dimension of a second audio signal applied thereto so that the time-expanded first and second audio signals exist in the same period of time, and means for coupling the output of said sequentially combining means alternately to said first and second time expanding means in response to said head moving past one half-section of each track.

13. A magnetic recording and/or reproducing apparatus having first and second transducer heads mounted on a rotary drum, wherien a magnetic tape is wound on an arc section of the circumference of said rotary drum to allow each of said heads to scan a track skewed relative to the length of the tape upon rotation of said drum, said second head being inclined at an angle to a reference differing for an angle of inclination of the first head to said reference, said tape being moved in a predetermined relationship with the speed of rotation of said drum to cause said heads to successively shift to the next track, comprising:

means for modulating the frequencies of different frequency carriers with an audio sigal and generating a series of frequency-modulated carriers each of which occurs in synchronism with the shifting of said transucer head from one track to the next and applying said frequency-modulated carriers to said first transducer head to record each of said carriers on a different track, so that there is a difference in frequency between carriers recorded on opposite sides of each track;

means for modulating a video signal upon a carrier having a frequency differing from the frequencies of said frequency-modulated carriers and applying the modulated video signal to said second head so that said modulated video signal is recorded in overlying relationship with each of said frequency-modulated carriers;

first filter means for separating the frequency-modulated carriers detected by said first transducer head into different frequency components;

first head control means for controlling said first transducer head in a direction transverse to the direction of scan in response to said different frequency components separated by said first filter means;

second filter means for separating the frequency-modulated carriers detected by said second transducer head into different frequency components; and second head control means for controlling said second head in a direction transverse to the direction of scan in response to the different frequency components separated by said second filter means.

14. A magnetic recording and/or reproducing apparatus as claimed in claim 7, wherein said frequency modulating means is arranged to modulate the frequencies of first, second, third and fourth different frequency carriers with said audio signal and generating a series of first, second, third and fourth frequency-modulated carriers for application to said head.

15. A magnetic recording and/or reproducing apparatus as claimed in claim 7, wherein said tracks are closely spaced apart without guard bands therebetween.

* * * * *